United States Patent
Bohmert

(10) Patent No.: US 11,595,070 B2
(45) Date of Patent: Feb. 28, 2023

(54) LTE MODULE REMOTE FROM A RECEIVER SYSTEM

(71) Applicant: Hirschmann Car Communication GmbH, Neckartenzlingen (DE)

(72) Inventor: Roland Bohmert, Reutlingen (DE)

(73) Assignee: Hirschmann Car Communication GmbH, Neckartenzlingen (DE)

( * ) Notice: Subject to any disclaimer, the term of this patent is extended or adjusted under 35 U.S.C. 154(b) by 4 days.

(21) Appl. No.: 16/932,150

(22) Filed: Jul. 17, 2020

(65) Prior Publication Data

US 2020/0350942 A1 Nov. 5, 2020

Related U.S. Application Data

(63) Continuation of application No. PCT/EP2019/051009, filed on Jan. 16, 2019.

(30) Foreign Application Priority Data

Jan. 17, 2018 (DE) .......................... 102018100919.4

(51) Int. Cl.
*H01Q 1/32* (2006.01)
*H04B 1/3822* (2015.01)
*B60R 16/023* (2006.01)

(52) U.S. Cl.
CPC ......... *H04B 1/3822* (2013.01); *B60R 16/023* (2013.01); *H01Q 1/3275* (2013.01)

(58) Field of Classification Search
CPC ...... B60R 16/023; H01Q 1/32; H01Q 1/3275; H04B 1/3822
See application file for complete search history.

(56) References Cited

U.S. PATENT DOCUMENTS

| 5,802,894 A * | 9/1998 | Jahrsetz | E05B 77/48 292/144 |
| 6,052,068 A * | 4/2000 | Price R-W | G07C 5/008 340/904 |
| 6,094,160 A * | 7/2000 | Lajiness | G01S 7/352 342/162 |
| 2004/0028145 A1* | 2/2004 | Katta | H04L 25/066 375/257 |
| 2004/0042555 A1* | 3/2004 | Kawada | H04L 25/066 375/257 |

(Continued)

FOREIGN PATENT DOCUMENTS

| DE | 102007056327 A1 | 5/2009 |
| DE | 102010007170 A1 | 10/2010 |

(Continued)

OTHER PUBLICATIONS

PCT International Search Report and Written Opinion, dated May 16, 2019, 9 pages.

(Continued)

*Primary Examiner* — Thien M Le
(74) *Attorney, Agent, or Firm* — Barley Snyder

(57) ABSTRACT

A receiver device in a vehicle includes a receiver system and a receiver module remote from the receiver system. A plurality of high-frequency signals are received or emitted via at an antenna attached to the receiver module. The high-frequency signals are transformed in the receiver module and forwarded to the receiver system.

13 Claims, 1 Drawing Sheet

(56) References Cited

U.S. PATENT DOCUMENTS

| | | | |
|---|---|---|---|
| 2006/0264111 A1* | 11/2006 | Ohtaki | H03G 3/3068 |
| | | | 439/637 |
| 2008/0242259 A1* | 10/2008 | Nowack | H04B 1/082 |
| | | | 455/345 |
| 2010/0202353 A1 | 8/2010 | Talty et al. | |
| 2016/0001662 A1* | 1/2016 | Miller | B60L 53/122 |
| | | | 307/104 |
| 2016/0154643 A1 | 6/2016 | Zhang et al. | |
| 2017/0269585 A1* | 9/2017 | Jaiswal | G05D 1/0022 |
| 2018/0156616 A1* | 6/2018 | Bennett | G01S 19/42 |
| 2018/0367261 A1* | 12/2018 | Gonzalves Serrano | |
| | | | H04L 1/0027 |
| 2018/0375199 A1 | 12/2018 | Papp et al. | |
| 2019/0073840 A1 | 3/2019 | Voigt et al. | |
| 2019/0199589 A1* | 6/2019 | Le | H04L 41/0816 |
| 2020/0000785 A1* | 1/2020 | Waters | A61K 31/4375 |

FOREIGN PATENT DOCUMENTS

| | | |
|---|---|---|
| DE | 102014010829 A1 | 1/2016 |
| DE | 102015016334 A1 | 6/2017 |
| DE | 102016002945 A1 | 9/2017 |
| DE | 102016205927 A1 | 10/2017 |
| DE | 102019101015 A1 | 7/2019 |
| JP | 6164704 B2 | 6/2017 |

OTHER PUBLICATIONS

Abstract of DE 102007056327, dated May 28, 2009, 1 page.
Abstract of DE 102014010829, dated Jan. 28, 2016, 1 page.
Abstract of DE 102016205927, dated Oct. 12, 2017, 1 page.
Japanese Office Action and English translation, Patent Application No. 2020-538812, dated Jul. 27, 2021, 6 pages.

* cited by examiner

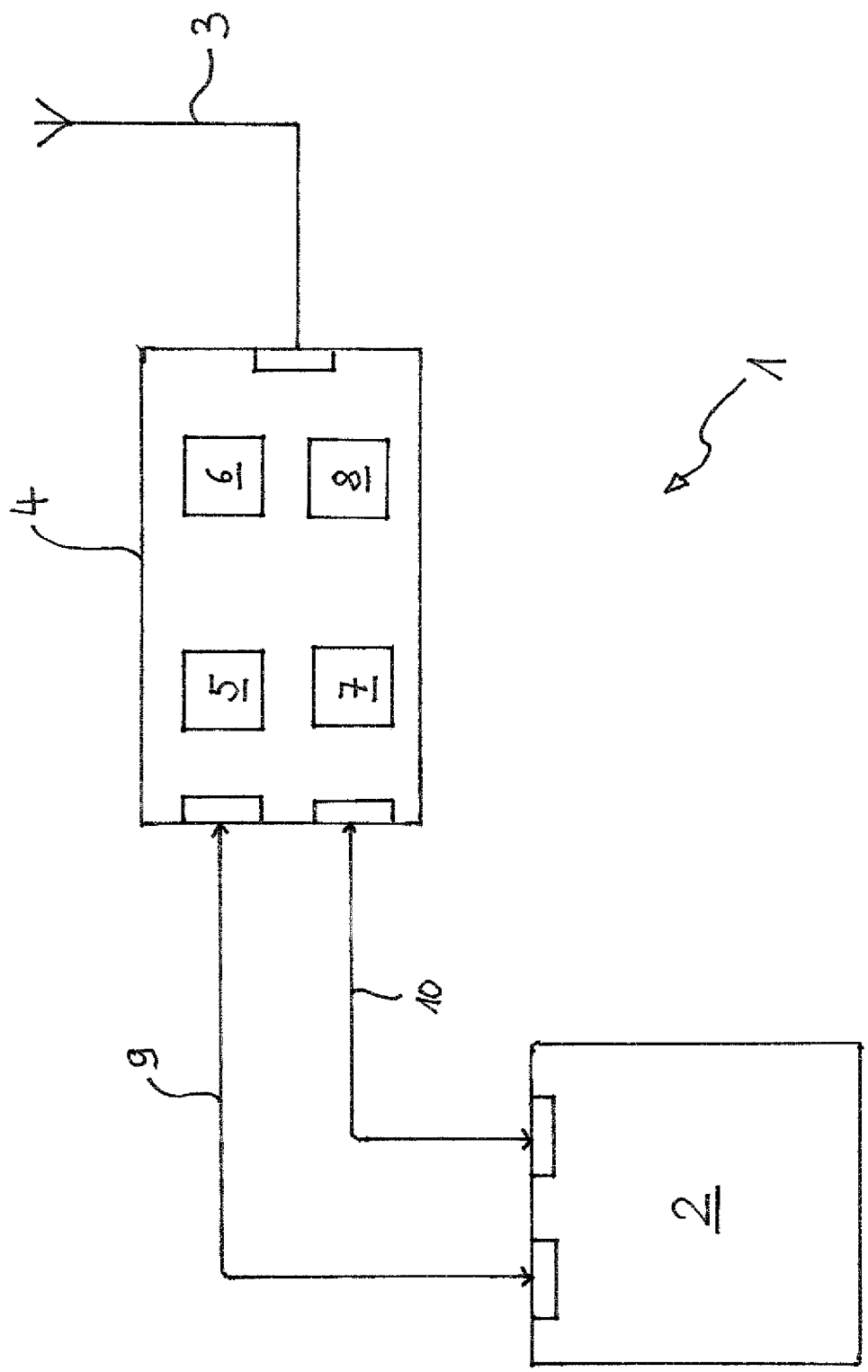

LTE MODULE REMOTE FROM A RECEIVER SYSTEM

CROSS-REFERENCE TO RELATED APPLICATIONS

This application is a continuation of PCT International Application No. PCT/EP2019/051009, filed on Jan. 16, 2019, which claims priority under 35 U.S.C. § 119 to German Patent Application No. 102018100919.4, filed on Jan. 17, 2018.

FIELD OF THE INVENTION

The present invention relates to a receiver device and, more particularly, to a receiver device of a vehicle.

BACKGROUND

Known receiver devices receive high-frequency signals via at least one antenna, and where appropriate via several antennas (diversity). The high-frequency signals are converted in a processing unit (in particular from a high frequency to an intermediate frequency), processed further, and then fed to the display (audibly and/or visually).

Such receiver devices are arranged in a housing, which is accommodated at a suitable location in a vehicle (in the region of the dashboard, for example). For the power supply, it is necessary to lead a power supply cable to the receiver device. Moreover, the cable of the antenna, generally a coaxial cable, must be routed to the receiver device over long distances in the vehicle. However, this is disadvantageous from the point of view of high-frequency technology.

For the processing of high-frequency signals, it is necessary to provide access authorization and/or charging. This is performed with a SIM card or the like, for example. For this purpose, the housing must be accessible for the insertion and replacement of the SIM card.

Since such receiver devices, in particular the receiver systems thereof, often operate on the basis of software, from time to time it is also necessary to update the software to the newest version or to reconfigure the entire receiver device.

Multi-receiver systems require coaxial cables (referred to as coaxial lines, and also as HF cables) for high-frequency signals. Furthermore, current and future technologies (such as 4G, 5G, DSRC, WLAN, for example) require n antennas and thus an n-fold multiplication of coaxial lines (n=number of antennas, preferably n is greater than 1).

This leads to high demands on the HF cable in relation to weight, HF damping and routing strategies in the vehicle. HF cables are regarded as costly in the motor vehicle sector. Line lengths are thus a financial consideration for the entire receiver device, in particular for the vehicle manufacturer. Furthermore, each signal processing operation, or processing, inside an appliance leads to further thermal losses, which have a negative influence on the life expectancy of individual electronic components and which can also lead to reduced reception performance.

SUMMARY

A receiver device in a vehicle includes a receiver system and a receiver module remote from the receiver system. A plurality of high-frequency signals are received or emitted via at an antenna attached to the receiver module. The high-frequency signals are transformed in the receiver module and forwarded to the receiver system.

BRIEF DESCRIPTION OF THE DRAWING

The invention will now be described by way of example with reference to the accompanying FIGURE, which is schematic block diagram of a receiver device according to an embodiment.

DETAILED DESCRIPTION OF THE EMBODIMENT(S)

Exemplary embodiments of the present disclosure will be described hereinafter in detail with reference to the attached drawing. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

A receiver device 1 according to an embodiment is shown in the FIGURE. The receiver device 1 is suitable and formed for receiving, further processing, and displaying high-frequency signals in a vehicle.

As shown in the FIGURE, the receiver device 1 has a receiver system 2, with which signals, data or the like are received and displayed (for example visually and/or audibly) and/or can be output. The receiver system 2 is connected in a wireless or a wired manner to a mobile appliance.

The high-frequency signals are received by at least one antenna 3 of the receiver device 1. The high-frequency signals may be unidirectional or bidirectional. The antenna 3 is connected to a receiver module 4 remote from the receiver system 2. The installation space in which the receiver system 2 is arranged and the installation space in which the receiver module 4 is arranged are different from one another and are separated, remote, or at a distance from one another. The receiver system 2 is arranged in the region of a dashboard of a vehicle, for example, whereas the remote receiver module 4 is installed underneath a roof, a bumper, or the like of the vehicle, for example, in a vicinity of the antenna 3. As a result, the transmission path of the high-frequency signals can be kept short.

The remote receiver module 4, as shown in the FIGURE, has an electronic, permanently installed subscriber identity module (SIM) card 5, also referred to as an eSIM card 5, an external SIM card 6, a processing unit 7 and optionally a diagnostics unit 8. For the external SIM card 6 and/or the internal (electronic) SIM card 5, correspondingly suitable embodiments (such as a USIM card also, for example) may be considered.

The high-frequency signals received or emitted with the antenna 3 are fed to the processing unit 7, processed further there and forwarded to an interface of the receiver module 4. The eSIM card 5 and/or the external SIM card 6, which can be inserted into the receiver module 4 from outside, are provided for the authorization or charging whereby the received high-frequency signals can be processed further by the receiver module 4.

The processing unit 7 prepares the high-frequency signals fed to it, processes them and makes them available likewise to the interface of the receiver module 4. Via this interface, the provided signals, for example data packets, are transmitted via a connection line, such as a data bus 9 shown in the FIGURE, and forwarded to the receiver system 2. The high-frequency signals are transformed in the receiver module 4 and forwarded to the receiver system 2. Furthermore, the receiver system 2 and the receiver module 4 are connected to one another via a power supply line 10. In an embodiment, the data bus 9 and the power supply line 10 are combined in a cable, a common line, at the ends of which in each case a plug connector is situated, it being possible for the respective plug connector to be plugged into a mating connector in the receiver system 2 and the receiver module 4. As a result, it is advantageously made possible for the receiver system 2 and the receiver module 4 to be arranged over a relatively large distance from one another in the vehicle and for the cabling outlay to be reduced significantly. Moreover, there is the advantage that the receiver module 4 can be arranged very close to the at least one antenna 3, in order to effectively avoid high-frequency technology problems which could arise on account of greater distances between the antenna 3 and the receiver module 4.

In an embodiment, the receiver module 4 is formed as an LTE module and the receiver system 2 is suitable and formed for performing communication with further appliances inside the vehicle in a wired and/or wireless manner. In other embodiments, the receiver module 4 is a module for other cellular services, such as 2G, 3G, 4G, 5G, and the like. In other embodiments, the receiver module 4 is a module for wireless services, such as C-V2X, V2X, DSRC, WiFi, Bluetooth, GNSS and the like.

The receiver system 2 has a transmission device, via which the receiver system 2 can communicate with appliances inside the vehicle (such as, for example, smartphones, tablets or the like). The data transmission takes place not only from the at least one antenna 3 via the remote receiver module 4 and the receiver system 2 in the direction of the appliance inside the vehicle, but rather the transmission is executed bidirectionally. This means that signals can also be output from an appliance inside the vehicle via the receiver system 2 and via the receiver module 4 via the at least one antenna 3. In this case, the at least one antenna 3 is not only a receiver antenna but also a transmitter antenna.

The separation of receiver system 2 and receiver module 4 has the advantage that a standard receiver system can be used and reception- or transmission-specific characteristics can be provided in the receiver module 4. Thus, the remote receiver module 4 can be adapted to the frequency ranges, for example, which are received with the at least one antenna 3. Moreover, different services (such as telephone, data services, navigation signals and the like) can be received by the receiver module 4 tuned for this purpose, processed further and forwarded to the receiver system 2. This processing takes place, in this case, advantageously in such a way that a standard receiver system 2 can be used, different receiver modules 4 being suitable and formed for receiving and processing different frequencies, different services and the like and for further processing (converting) them in such a way that these converted signals are standard signals, which can be received and processed further by the standard receiver system 2.

The system presented above converts the high frequency (HF) services locally at the antenna 3 to digital signals (remote baseband unit) and forwards these data to a remote unit (domain controller unit) for processing. Furthermore, the presented system bundles several technologies onto a "digital" cable. This reduces damping of the signal level and shorter line lengths lead to lower weight in relation to the cable harness.

The presented system bundles the data from several services (thus several HF coaxial cables) onto a digital line, which can be routed more easily in the vehicle (for example MiMo 4G/5G 4× coaxial cables, DSRC 2× coaxial cables, GNSS 1× coaxial cable and the like). The digital signals are converted and prepared for the user particularly advantageously in a remote, thermally less demanding environment in the vehicle.

What is claimed is:

1. A receiver device in a vehicle, comprising:
   a receiver system; and
   a receiver module remote from the receiver system, a plurality of high-frequency signals are received or emitted via at an antenna attached to the receiver module, the receiver module is arranged closer to the antenna than to the receiver system, the high-frequency signals are transformed to a digital signal in the receiver module and forwarded to the receiver system.

2. The receiver device of claim 1, wherein the plurality of high-frequency signals may be unidirectional or bidirectional.

3. The receiver device of claim 1, wherein the receiver system is connected in a wireless or a wired manner to a mobile appliance.

4. The receiver device of claim 1, wherein the receiver system and the receiver module are connected to one another by a data bus.

5. The receiver device of claim 4, wherein the receiver system and the receiver module are connected to one another by a power supply line.

6. The receiver device of claim 5, wherein the data bus and the power supply line are combined in a common line.

7. The receiver device of claim 1, wherein the receiver system is a standard receiver system and reception- and/or transmission-specific characteristics are provided in the receiver module.

8. The receiver device of claim 1, wherein the receiver module has a permanently installed electronic SIM card and/or a receptacle device for an external SIM card.

9. The receiver device of claim 1, wherein the receiver module has a processing unit preparing and processing the high-frequency signals.

10. The receiver device of claim 1, wherein the receiver module has a diagnostics unit.

11. The receiver device of claim 1, wherein the receiver system communicates with a plurality of further appliances inside the vehicle in a wired and/or wireless manner.

12. The receiver device of claim 1, wherein the receiver module is a module for cellular services.

13. The receiver device of claim 1, wherein the receiver module is a module for wireless services.

* * * * *